March 22, 1927.  A. ELLZEY  1,622,189
DEVICE FOR ATTACHING LUGS TO VEHICLE WHEELS
Filed June 11, 1926   3 Sheets-Sheet 1
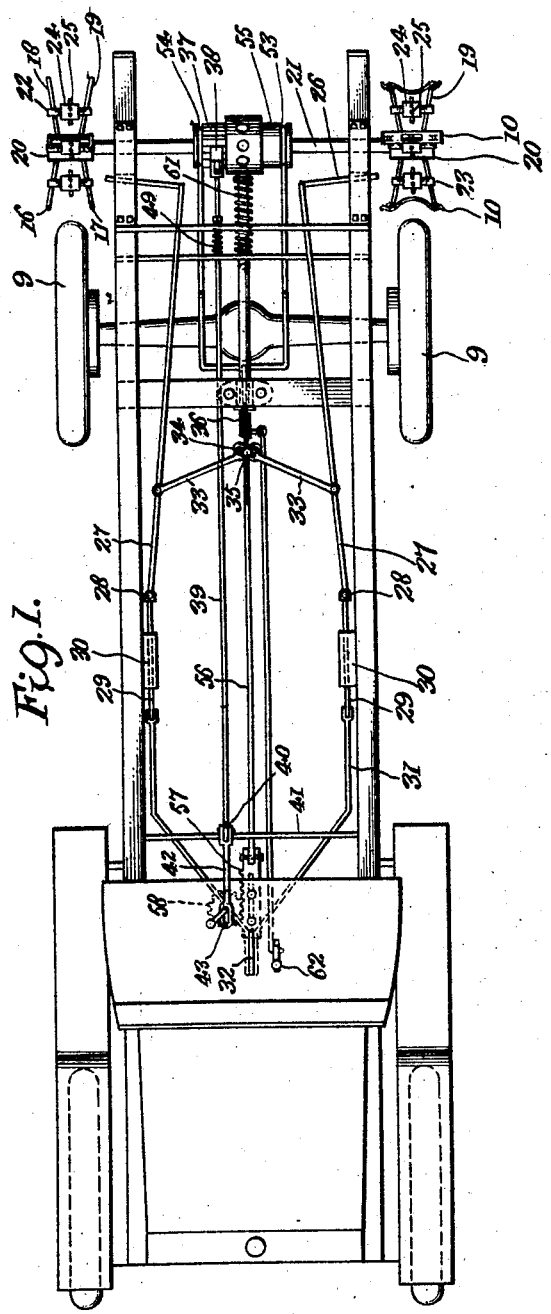
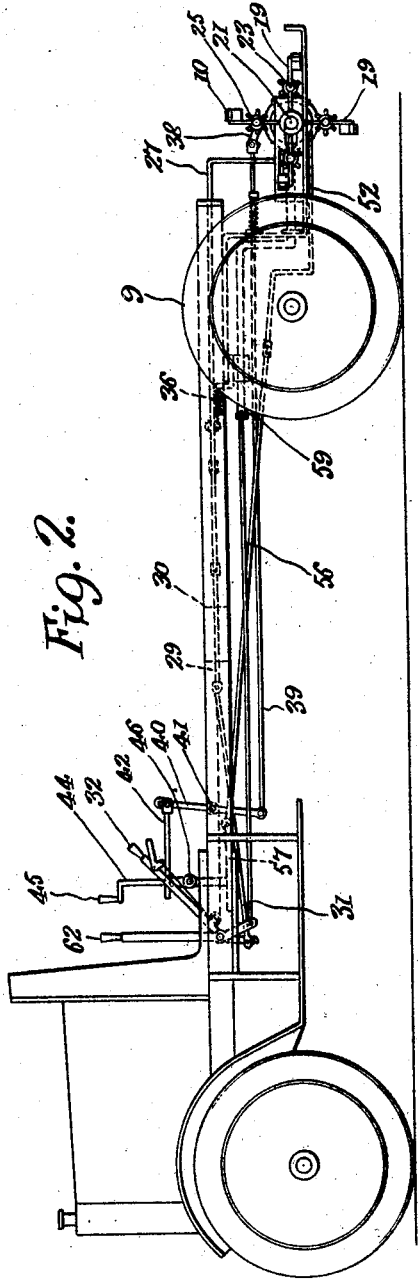
INVENTOR
Ambrose Ellzey
BY
Wilkinson & Giusta
ATTORNEYS.

March 22, 1927.
A. ELLZEY
1,622,189
DEVICE FOR ATTACHING LUGS TO VEHICLE WHEELS
Filed June 11, 1926   3 Sheets-Sheet 2
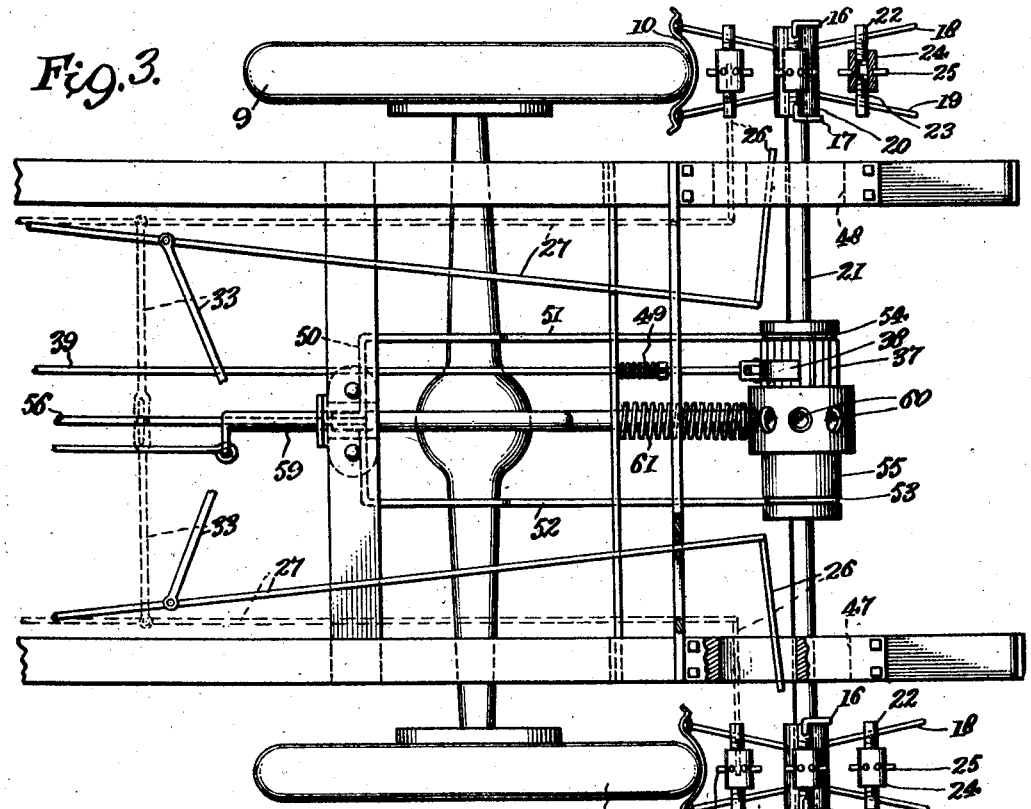
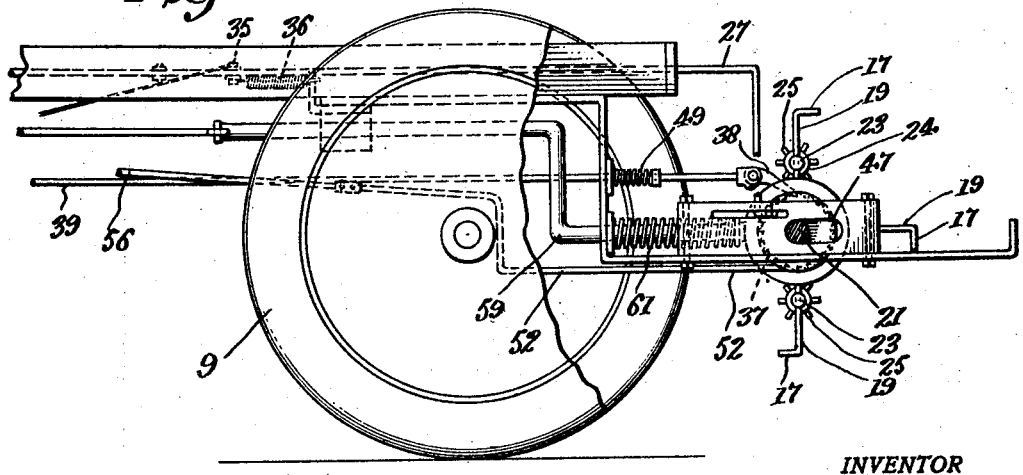
INVENTOR
Ambrose Ellzey
BY Wilkinson & Giusta
ATTORNEYS.

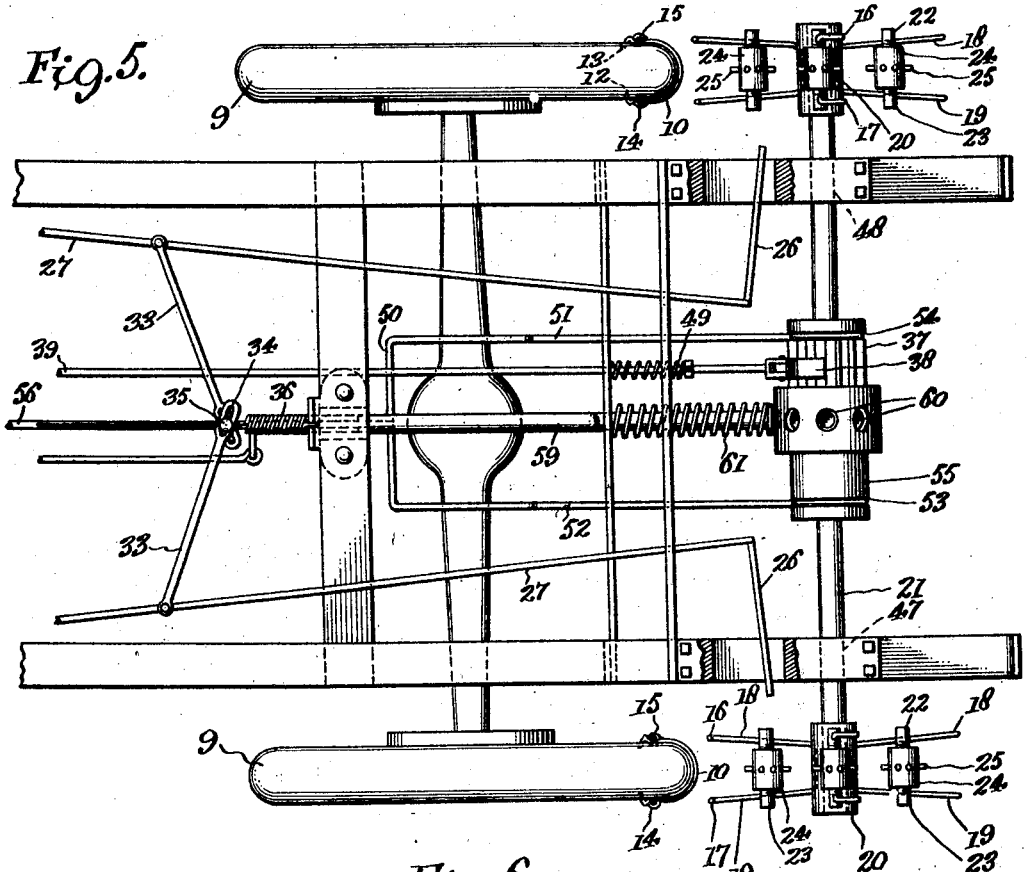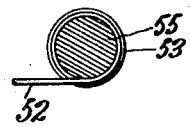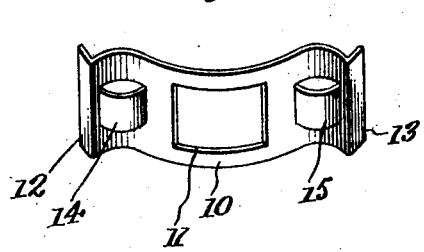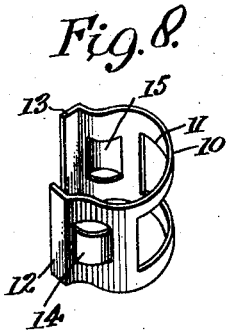

Patented Mar. 22, 1927.

1,622,189

UNITED STATES PATENT OFFICE.

AMBROSE ELLZEY, OF FLORIEN, LOUISIANA.

DEVICE FOR ATTACHING LUGS TO VEHICLE WHEELS.

Application filed June 11, 1926. Serial No. 115,410.

The present invention relates to improvements in devices for attaching lugs to vehicle wheels and has for an object to provide a device which will attach to the wheels of automobiles or other vehicles anti-skid lugs, which are in the nature of devices to take the place of tire chains.

Another object of the invention is to provide a device for this purpose which will be entirely carried by the vehicle, will be automatic in action and may be controlled by the operator of the vehicle without leaving the driver's seat.

With the foregoing and other objects in view, the invention will be described in detail hereinafter, and referred to more particularly in the sub-joined claims.

The invention will be described in connection with the accompanying drawings, in which like parts are referred to by the same reference characters, and in which—

Figure 1 is a top plan view of a vehicle chassis shown equipped with the improved device;
Figure 2 is a side elevation of the same;

Figure 3 is an enlarged fragmentary top plan view, showing the rear portion of the chassis with the improved device in a subsequent position;
Figure 4 is a side elevation of the same with part of the wheel broken away;

Figure 5 is a view similar to Figure 3 but with the parts in another position;

Figure 6 is a cross-section through the axle of the device;

Figure 7 is a perspective view of the lug in the expanded condition; and

Figure 8 is a similar view of the lug in its normally contracted condition.
Referring more particularly to the drawings, the idea of the invention is to provide a device which will apply about the rear tires 9 of the vehicle or about all of the tires thereof, mud or anti-skid lugs of the construction shown in Figures 7 and 8.

Referring particularly to this mud or anti-skid lug, the same is constructed of a strip of resilient metal 10 preferably having the central rectangular opening 11 for the purpose of lightness and for presenting edges and corner portions for catching in the roadway, in ice, snow, mud, etc., to give the lug a hold upon the road surface. The ends of the lug strip are made with the clamping flanges 12 and 13, shaped to embrace the side portions of the tire, rim or wheel structure. Adjoining the clamping flanges are the pressed-out ears 14 and 15 made preferably of the material of the lug strips by forming incisions which are parallel to each other above and below the strips and then forcing the metal between the incisions outwardly into substantially semi-circular form. The metal possesses an inherent resiliency and is given a bend to the shape shown in Figure 8, so that the lug strip will seek this contracted condition whenever released from the holding device. This will cause the mud lug to tightly grip the tire or the wheel and to hold it thereon. As many of the mud lugs as desired can be applied to each tire or wheel and, for example purely, I have shown a device for applying four such mud lugs to each of the wheels as this number will ordinarily be found sufficient for preventing skidding and avoiding stalling of the vehicle in mud holes or other places where good traction cannot be had.

The pressed-out ears 14 and 15 of each mud lug are adapted to be received upon the companion hooks 16 and 17 turned at right angles from the arms 18 and 19. These arms are resilient and are mounted in a hub structure 20. Four pairs of such arms are shown as mounted at 90° apart in the hub structure 20, and two such hub structures are shown, one opposite each of the back tires of the vehicle, the hub structures being carried upon opposite ends of the shaft 21.

The resilient arms 18 and 19 are arranged so that they may be expanded away from one another or contracted toward each other in order to correspondingly expand or permit of the contraction of the mud lug they carry. For this purpose the arm 18 is held in a screw stub 22, while the companion arm 19 is fixed to a reversely threaded screw stub 23. The inner ends of these screw stubs are threaded into the internally threaded sleeve 24. By rotation of this sleeve in the one direction, the stubs will be drawn together and upon opposite rotation of the sleeve, the screw stubs will be moved outwardly away from each other. In order to turn the sleeve 24, pins 25 or teeth are provided thereupon projecting outwardly from the intermediate part of the sleeve for engagement by an escapement device or by the arm 26. This arm is carried upon a rod 27 extending longitudinally of the vehicle. The rod 27 is pivoted at its forward end as shown at 28 to a bar 29 sliding in the guide sleeve on the chassis of the vehicle and the forward end of this bar 29 is pivotally coupled to link 31 and this link has a portion disposed diagonally, shown in Figure 1, in order to bring it to a central point where it is attached to an operating lever 32 arranged conveniently to the hand of the driver of the vehicle. The rod 27 is adapted to move back and forth longitudinally of the vehicle and also to swing in and out (compare Figures 3 and 5). Its longitudinal movement is accomplished through the swinging of the lever 32 and its lateral or transverse movement is accomplished by coupling the rod 27 to a link 33 having a slotted end 34 engaging loosely about a pin 35 upon the chassis. Two such links 33 are, of course, provided for the two rods 27 necessary, and in such case the pin 35 may simply be coupled to the two links. When these links are in the straight position the arms 26 will be thrust outwardly into engagement with the pins 25 of the sleeves 24. Spring 36 bearing upon the pivot point 35 may be used to return the arms 26 to the inner position shown in Figure 3.

By swinging the lever 32 back and forth one or more times, the sleeve 24 will be rotated in one or the other direction. In Figure 3 the arms 26 are shown dotted in a neutral position, as engaged with pins 25 and in accordance with the direction of movement of the lever 32, the sleeve 24 will be turned either to contract or expand the arms 18 and 19. For instance, in applying the lug, such lug will be carried in the expanded condition shown in Figure 3 and the device will be manipulated so as to draw the arms 18 and 19 together or into the position shown in Figure 5, thereby allowing the mud lug, by its inherent elasticity to contract about the vehicle wheel. When it has tightly embraced the wheel, the shaft 21 is rotated, causing the hooks 16 and 17 to be disengaged from the mud lug and to thereby leave it upon the tire or wheel.

The vehicle is then moved a short distance to bring another portion of the tire 9, say at substantially 90° from the place where the first lug was located, and the shaft 21 and the axle 20 are rotated to bring the next mud lug into position against the tire. Of course, during the rotation of the shaft and the mud lug carrying arms, the sleeve actuating means are drawn inwardly to the position shown in Figure 3.

Now the rotation of the shaft 21 is accomplished by providing upon such shaft a ratchet wheel 37 which is engaged by a movable pawl 38. This pawl is carried upon and moved by a longitudinally extending rod 39 which extends up beneath the driver's seat of the vehicle where it is coupled to the lower end of the lever 40 fulcrumed at 41 upon the vehicle chassis as shown in Figure 2, and having its upper end loosely coupled to a link 42. This link 42 is provided with a slotted forward end 43 shown in Figure 1 which engages loosely about the shank of the lever 44. This lever 44 is capable of rotation, for which purpose it is provided with the off-set crank handle 45 and it is also mounted pivotally as indicated at 46 for an oscillatory movement.

By oscillating the lever 44 the pawl 38 may be shifted back and forth and thus cause to rotate the shaft 21 in one direction. This will be a clock-wise direction as looked at in Figure 2. The shaft 21 is slidable backwards and forwards in slotted bearings 47 and 48 in order to bring the lugs against or away from the tires 9. As it is necessary to keep the pawl 38 up against the ratchet wheel 37 in both positions, a coil spring 49 is wound about the rod 39. The slot 43 at the forward end of the rod 39 is provided to take up this longitudinal movement in the shaft 21. The shaft is shifted by use of a yoke device 50 having the arms 51 and 52, the front ends of which are curled about in the grooves 53 and 54 made in the end portions of a cylinder or spool 55 which is fixed to the central part of the shaft 21, and of which the ratchet wheel 37 is a part. The yoke 50 is coupled for longitudinal shifting to a central rod 56 and this rod extends up to a rack bar 57 shown in Figure 1, the teeth of which rack bar mesh with the teeth of a pinion 58 on the lower end of the oscillatory and rotary lever 44. By turning the handle 45 of the lever shaft 44, the shaft 21 at the rear may be shifted back and forth.

It is desirable to hold the shaft 21 in any desired angular set position and for this purpose I provide a latch rod 59 positioned to enter sockets 60 made in the central raised portion of the drum 55. The latch rod is urged into the socket presented by a coil spring 61.

The latch rod is manipulated by means of a lever 62 also positioned at the forward portion of the vehicle. The coil spring 61 will maintain the latch rod 59 in engagement with the socket 60 irrespective of the forward or rear position of the shaft 21.

In the operation of the invention, the parts are normally in the position shown in Figure 1 in which the shaft 21 occupies the rear position to hold the mud lugs and the other parts out of contact with the rear tires 9. For the sake of clearness in the drawings the mud lugs have been left off one set of the spider arms. Upon the other set of arms the mud lugs are shown held in the expanded condition ready for application to the tire when occasion demands. Should the vehicle run into a mud hole or into a stretch of icy or snow-bound road, the lugs may be applied to the wheels or tires by the driver without leaving his seat by observing the following sequence of operation.

The shaft 21 must be first released for rotation and this is accomplished by the swinging forward of the lever 62 to disengage the latch rod 59. The shaft 21 is then free to be rotated by manipulating the pawl 38 backwards and forwards through the oscillating movement of the lever 44. When one of the mud lugs, in the expanded condition carried by the spider arms, is brought opposite the tire, the rotary movement is arrested and the shaft 21 carrying the spider arms is then advanced forwardly by pulling forward upon the yoke 50. This is accomplished through rotating the handle 45.

Of course, if the mud lug happens to be originally in a position opposite the tire, this initial rotary movement in the shaft 21 will not be necessary; but the shaft 21 may be in the first instance advanced forwardly.

In any event as soon as the mud lug has been brought against the tire (see Figure 3), the arms 26 are manipulated to cause contraction of the lug holding arms 18 and 19 to permit contraction of the lug about the tire and wheel; or the mud lug may be brought into such frictional contact with the tire that upon rotation of the tire the mud lug will be moved off the hooks 16 and 17. As soon as it is disengaged from the hooks it will contract about the tire. In any event after the mud lug is contracted, by turning of the wheel in a proper direction, the mud lug will be disengaged from the hooks 16 and 17. The wheels 9 are then turned a sufficient distance to permit the next lug to be applied at a properly spaced interval and the next lug is brought to position by rotating the shaft 21 through the action of the pawl 38.

In removing the lugs from the wheels, the arms 18 and 19, in the contracted condition are brought to a radial position with respect to the vehicle wheel and the vehicle wheel is then turned to bring the lug down upon the hooks 16 and 17, whereupon the sleeve 24 is turned by manipulation of the arms 26 until the arms 18 and 19 are expanded. The shaft 21 is then caused to retire backwardly carrying the expanded lug away from the wheel. All of the lugs are in turn removed in the same manner and the shaft 21 is finally left in the rear position until subsequent occasion demands the use of the mud lugs.

It is obvious that various changes and modifications may be made in the details of construction and design of the above specifically described embodiment of this invention without departing from the spirit thereof, such changes and modifications being restricted only by the scope of the following claims.

Having thus described my invention, what I claim and desire to secure by Letters Patent of the United States, is:—

1. A device for attaching mud lugs to vehicles comprising a pair of laterally expansible arms mounted for longitudinal shifting movement upon the vehicle and being adapted to carry a mud lug, means for expanding and contracting said arms, means for rotating said arms, and means for shifting said arms toward the vehicle wheels to which the mud lugs are to be applied.

2. A device for attaching mud lugs to the wheels of vehicles comprising a longitudinally shifting shaft extending laterally of the vehicle adjoining the wheels thereof, means for longitudinally shifting said shaft, pairs of laterally shiftable lug carrying arms mounted on said shaft, means to rotate said shaft and the pairs of arms, and means for drawing said arms toward one another and for moving said arms apart.

3. A device for applying mud lugs to the wheels of vehicles comprising a longitudinally shifting shaft disposed laterally of the vehicle frame adjacent the tire thereof, pairs of laterally movable lug carrying arms mounted to rotate with said shaft, means for rotating said shaft and said arms, means for latching the shaft against rotation, means for longitudinally shifting the shaft and arms, and means for moving said arms together and apart.

4. A device for applying mud lugs to the wheels of vehicles comprising a longitudinally shifting shaft mounted in the framework of the vehicle adjoining the wheels thereof, means for shifting said shaft backwards and forwards, means for latching said shaft against rotation in both the forward and rearward positions thereof, means for rotating said shaft in either position, pairs of laterally shiftable lug carrying arms arranged to rotate and to move back and forth with said shaft, and means for contracting and expanding said arms.

5. A device for applying mud lugs to the wheels of vehicles comprising a transversely disposed shaft located adjacent the vehicle wheels for longitudinal shifting movement in the frame of the vehicle, means for moving said shaft back and forth, a latching device for preventing the rotation of said shaft, means for causing said latching device to follow the back and forward movement of said shaft, means for rotating said shaft when the latching device is disengaged, pairs of laterally expansible arms arranged to move with said shaft, and means independent of the shaft for expanding and contracting said arms.

6. A device for applying mud lugs to the wheels of vehicles comprising a laterally disposed shaft mounted for longitudinal movement in the vehicle frame adjacent the wheels thereof, means for moving said shaft forwardly and backwardly, a latching device for said shaft, a ratchet mechanism for rotating said shaft, means for maintaining engagement between the elements of the ratchet device and all positions of the shaft, pairs of contractable arms moving with said shaft, and means for expanding and contracting said arms.

7. A device for applying mud lugs to the wheels of vehicles comprising rotary and longitudinally shifting spiders comprising pairs of laterally shiftable mud lug carrying arms, reversely threaded screw stubs connected to companion arms, a threaded sleeve engaging both said stubs, and means for rotating said sleeve in either direction to contract or expand said arms with the lug thereon.

8. A device for applying mud lugs to the wheels of vehicles comprising spiders mounted for longitudinal and rotary movement on the vehicle adjacent the wheels thereof, said spiders comprising numbers of spaced pairs of laterally shiftable arms having hooks thereon opened in one circumferential direction for receiving the mud lugs, and means distinct and apart from said spiders for causing the contraction and expansion laterally of the pairs of arms and the consequent expansion and contraction of the mud lugs.

9. A device for applying mud lugs to the wheels of vehicles comprising resilient lugs normally adapted to contract about the tire and having ears thereon, spiders movably carried by the vehicle adjacent the tire and having pairs of laterally moving arms having hooks to engage with the ears of the lugs, and means for contracting and expanding said arms and the lugs therewith.

AMBROSE ELLZEY.